United States Patent [19]

Hintner

[11] Patent Number: 4,801,179
[45] Date of Patent: Jan. 31, 1989

[54] LOAD-DEPENDENT BRAKE PRESSURE CONTROL DEVICE FOR PNEUMATIC BRAKES OF RAIL VEHICLES

[75] Inventor: Josef Hintner, Turkheim, Fed. Rep. of Germany

[73] Assignee: Knorr-Bremse AG, Munich, Fed. Rep. of Germany

[21] Appl. No.: 81,257

[22] Filed: Aug. 3, 1987

[30] Foreign Application Priority Data

Aug. 1, 1986 [DE] Fed. Rep. of Germany ....... 3626191

[51] Int. Cl.$^4$ ............................................... B60T 8/18
[52] U.S. Cl. .................................... 303/22.2; 303/22.6; 188/195
[58] Field of Search ................ 303/22 R, 23 A, 23 R, 303/40, 54, 56, 77, 78, 22.1, 22.2, 22.6, 22.7; 137/627.5; 188/195

[56] References Cited

U.S. PATENT DOCUMENTS

| 3,612,621 | 10/1971 | Scott | 303/23 R |
| 3,671,086 | 6/1972 | Scott | 303/23 R |
| 4,080,005 | 3/1978 | Engle | 303/23 R |
| 4,235,477 | 11/1980 | Hart | 303/22 R |
| 4,235,478 | 11/1980 | Billeter | 188/195 X |

FOREIGN PATENT DOCUMENTS 2520461 11/1976 Fed. Rep. of Germany .... 303/22 R

Primary Examiner—Andres Kashnikow
Assistant Examiner—Timothy Newholm
Attorney, Agent, or Firm—Pollock, Vande Sande & Priddy

[57] ABSTRACT

The control device has a key valve (7) with a differential piston (13) and a scanning arm (18) that can be moved by it. The differential piston (13) is charged on its smaller surface (12) by a first brake pressure emitted by the brake control valve (2), and on its larger surface (14) by a reduced second brake pressure derived from the first brake pressure by means of a reduction valve (23, 26), which can be opened by the differential piston (13) only by a motion of a scanning arm (18), corresponding to a vehicle when unloaded, by means of a stop (24). The second brake pressure charges a switching piston whcih shifts the closing point of the reduction valve (23, 26) in the direction of motion of the differential piston (13) for lifting the scanning arm, and switches a shuttle valve (10, 35, 38) which charges a brake cylinder (44) either with the first or the second brake pressure. The volume of the spaces conducting the second brake pressure is increased by an air container (42). The key valve (7) has a very simple construction and, after an initial scanning touch, again lifts the scanning arm (18) during braking of an unloaded vehicle from its abutment (21'), which prevents unnecessary wear and tear.

9 Claims, 2 Drawing Sheets 4,801,179

LOAD-DEPENDENT BRAKE PRESSURE CONTROL DEVICE FOR PNEUMATIC BRAKES OF RAIL VEHICLES

FIELD OF THE INVENTION

The invention concerns a load-dependent brake pressure control device for indirectly acting, direct-release pneumatic brakes of rail vehicles, with a brake control valve controlling a first brake pressure, with a key valve which has a key piston that can be acted on by the first brake pressure against spring force for moving a scanning arm sensing the vehicle spring deflection and a valve device switching in dependence on the appropriately adjustable key position of the sensing arm, whereby the valve device transmits, in a loaded vehicle, the first brake pressure to a brake cylinder according to the relevant key position, and, in an unloaded vehicle, to an air container, according to that key position, and with a reduction valve controlled by a differential piston, which reduces the first brake pressure to a second brake pressure, which also can be transmitted to the brake cylinder, whereby the differential piston is acted on, on its smaller surface, by the first brake pressure prevailing in a first impact space and, on its larger surface, by a second brake pressure, prevailing in a second impact space, and whereby the reduction valve is constructed as a holding valve opening in the flow direction to the brake control valve.

BACKGROUND OF THE INVENTION

Such a brake pressure control device is known from U.S. Pat. No. 4,080,005. In this reference, the key valve is an operating piston for a sensing arm, constructed as a slide piston, which will only in its position for an unloaded vehicle interrupt an otherwise open connection from the exit connection of the brake control valve, transmitting the first brake pressure to the brake cylinder and, for this purpose, transmits the first brake pressure to an air container. Simultaneously, the first brake pressure is transmitted to a separate valve organ containing the differential piston, which reduces it to the second brake pressure. By way of pipeline connecting the valve organ to the brake cylinder, the second brake pressure reaches the brake cylinder. Due to the division into a key valve and a separate valve organ, the known installation is costly to build and needs many connecting lines, which increase the costs of assembly. The slide valve in the key valve is a component that is subject to heavy wear, and the sensing arm is pressed during each braking action against an unsprung part for the whole duration of the braking in a loaded as well as in an unloaded vehicle, with the result that a relatively high degree of wear also is likely at the respective contact sites. In addition, the riding shocks acting on the sensing arm stress all the movable parts of the key valve and lead to unnecessary wear.

U.S. Pat. No. 3,671,086 discloses a non-generic but similar load-dependent brake pressure control device in which the sealing plate of the reduction valve can be intercepted by means of a stop on the differential piston and lifted by the latter from its valve seat. Otherwise, this arrangement shows defects similar to those cited above.

U.S. Pat. No. 3,612,621 discloses another load-dependent brake pressure control device in which the key valve is jointly constructed with the valve organ containing the differential piston and the reduction valve. However, this non-generic brake pressure control device requires a separate connection to a compressed air supply device.

SUMMARY OF THE INVENTION

The invention addresses the problem of constructing a load-dependent brake control device of the type described above in such a manner that it consists of only a few components, not subject to wear, and is easy to install, without need for a separate compressed air supply and requiring only few line connections. In addition, the brake pressure control device should not keep the sensing arm pressed against an unsprung vehicle part for the entire braking time, at least under one load condition of the vehicle, this effecting a substantial wear reduction.

In general, the brake pressure control device to be designed should avoid the defects of prior art installations.

According to the invention, this problem is solved by providing that the differential piston together with the reduction valve, forming a part of the valve installation, is arranged in the key valve and mechanically coupled to the sensing arm, whereby the first brake pressure impact is directed in the direction of motion of the sensing arm to the key positions;

a first valve part of the reduction valve, spring-loaded in the closing direction, can be coupled to the differential piston by a stop in the opening direction of the reduction valve, whereby the stop has a play, the size of which, relative to the lift of the differential piston for adjusting the key positions of the sensing arm, is located between the lifts for the key positions for loaded and empty vehicles;

a second valve part of the reduction valve arranged in a connection between the first and a third impact space is also connected to a switching piston arranged in the key valve, which is acted on, effective in the opening direction of the reduction valve, against pressure force, by the second brake pressure prevailing in the third impact space and the lift of which is less than the play of the stop coupling;

the third impact space is connected to the container, and there is a shuttle valve, switching is dependence on the second brake pressure, which connects the brake cylinder with the switching piston that is not acted on to a space that constantly holds the first brake pressure, or to the container.

DESCRIPTION OF PREFERRED EMBODIMENT

Figure 1:
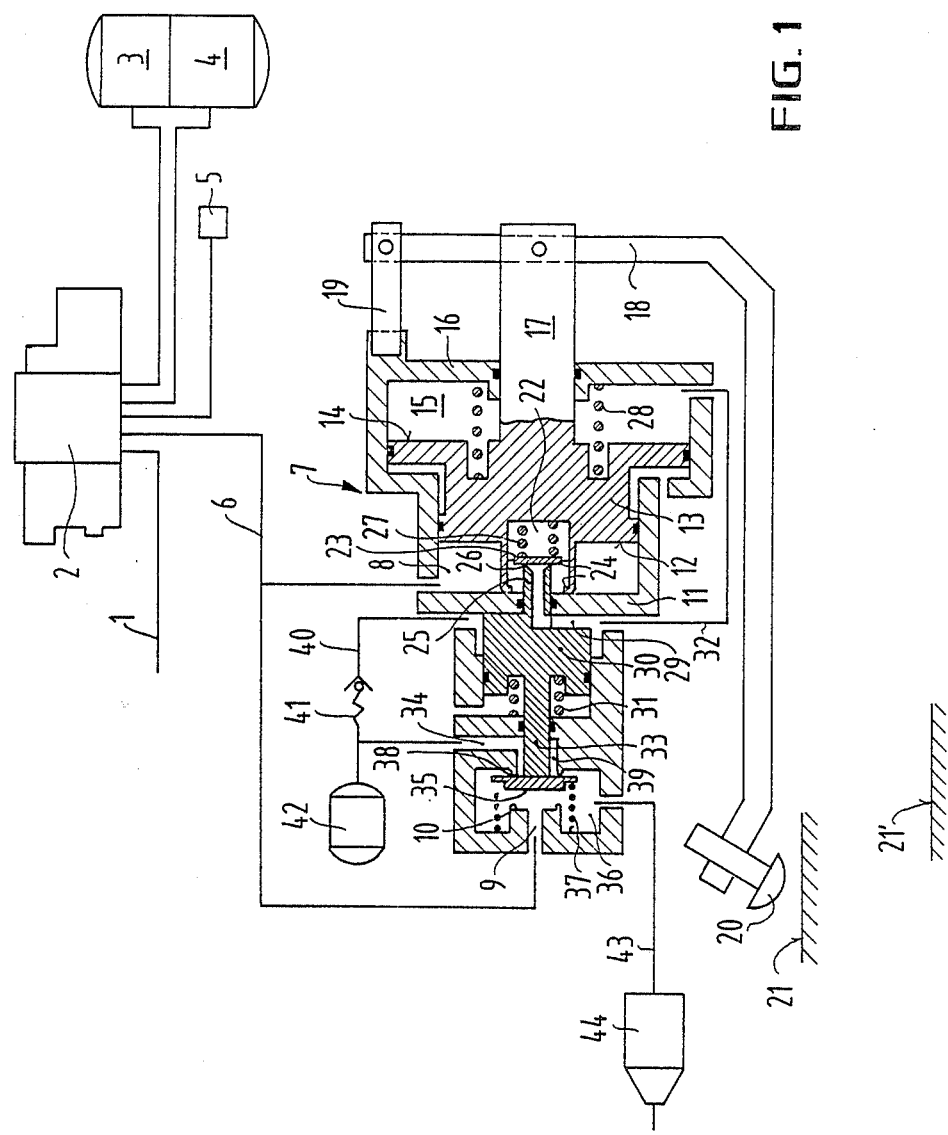
FIGS. 1 and 2 show schematically two different embodiments of the brake pressure control device according to the invention.
Figure 2:
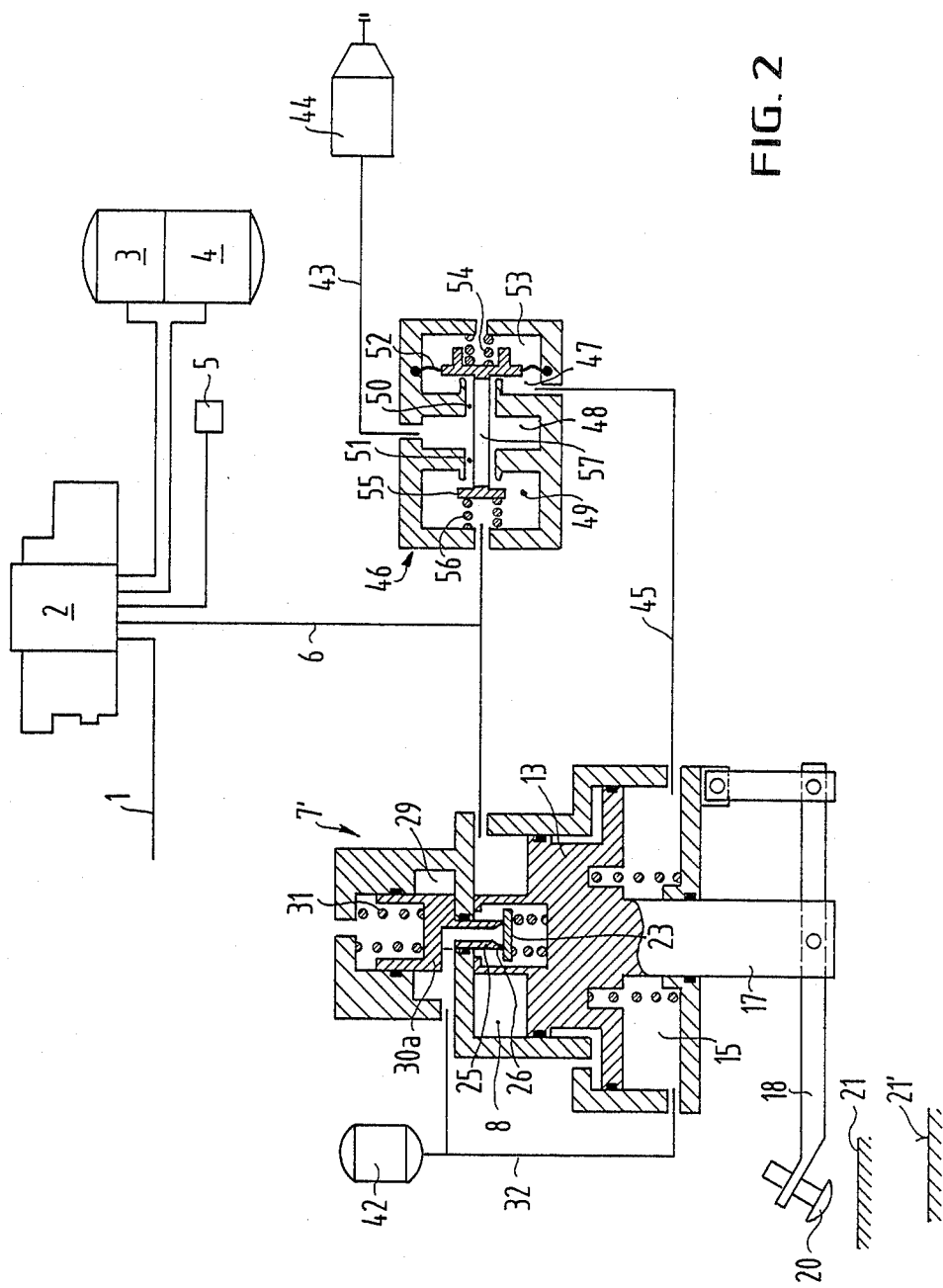

According to FIGS. 1 and 2, a brake control valve 2 of the direct-release type is connected to a main air line 1, which, in the usual manner, is connected to an auxiliary air container 3, an emergency brake container 4 and a retainer valve 5 switched behind its brake air release. The brake control valve 2 leads a first brake pressure into a pipeline 6, which leads it into the main air line 1 in dependence on the pressure behavior.

According to FIG. 1, the pipeline 1 leads to a key valve 7 and opens there into a first impact space 8 and into the interior space 9 of the valve seat 10 arranged on the front end of the key valve 7. The first impact space 8 is delimited, on the one hand, by a housing wall 11, and on the other hand, by the smaller surface 12 of a differential piston 13. The larger surface 14 of the differential piston 13 borders on a second impact space 15 which, on the other side, is bordered by its front wall 16 of the housing; the housing front wall 16 forms the front side of the key valve 7 remote from the valve seat 10. The differential piston 13 carries a piston rod 17, which is mounted, movably sealed, in the housing front wall 16, and the end of which is linked to a section of a sensing arm 18 extending transversely to the axis direction of the key valve 7. One end of the sensing arm 18 is pivotably linked to a bearing block of the key valve 7. Otherwise, the sensing arm 18 is bent towards a lengthy segment, extending substantially parallel to the axial direction of the key valve 7, which ends in an adjustment screw 20. During the extension of the piston rod 17 from the housing front wall 16, the sensing arm 18 is turned counter-clockwise, whereby the adjustment screw 20 is lowered until it impacts an unsprung abutment 21 or 21' of a vehicle part. Reference numeral 21 shows the abutment in its position on a loaded vehicle, and reference numeral 21' in its non-loaded position, relative to the key valve 7. When the vehicle is loaded, its springs are depressed, whereby the height positions of key valve 7 and abutment 21 approach each other as compared to abutment 21' in the non-loaded vehicle.

On the side of the first impact space 8, the differential piston 13 has an recess 22, opening towards it, in which there is a movable sealing plate 23, forming a first valve part. An inside flange ring provided at the end of the recess 22, jointly with the rim of the sealing plate 23 forms a stop 24 with play. The sealing plate 23 is opposed on the side of the first impact space 8 by a valve seat 26 which forms the end of a valve pipe 25. A spring 27 braced against the bottom of the recess 22 impacts on the sealing plate 23 in the pressing direction against the valve seat 26. The sealing plate 23 and the valve seat 26 form a reduction value 23, 26 which also works like a reflux valve. In the second impact space 15 is another spring 28, larger and stronger than spring 27, which stresses the differential piston 13 in the shifting direction towards the valve pipe 25. The valve pipe 25 passes with a seal movably through the housing wall 11, and its interior space opens into a third impact space 29. A pressure medium channel 32 connects the second and the third impact spaces 15 and 29. The third impact space 29 is delimited by a switching piston 30 to which the valve pipe 25 is attached. On the side remote from the third valve space 29 the switching piston 30 is impacted by atmospheric pressure and the force of a spring 31. The switching piston 30 carries, on the side remote from the third impact space 29, a plunger 33 which in a sealed movable manner extends into the entry space 34 and ends there in front of a double sealing plate 35. The double sealing plate 35 is located in a valve chamber 36 and is stressed by a spring 37 in the pressing direction against a valve seat 38 which surrounds an opening 39 through which the plunger 33 can extend, in a housing wall separating the entry space 34 from the valve chamber 36. The two valve seats 10 and 38 face each other in the valve chamber 36; they can be alternately covered by the double sealing plate 35. The two valve seats 10 and 38 thus form, jointly with the double sealing plate 35, a shuttle valve 10, 35, 38 containing the two valve parts 10, 35 and 35, 38. From the third impact space 29, a pressure medium channel 40 leads through an impact valve 41, opening in this flow direction, to the entry space 34; an air container 42 is also connected to the latter. A brake cylinder 44 is connected to the valve chamber 36 by a pipeline 43.

The differential piston 13, the switching piston 30, the reduction valve 23, 26 and the shuttle valve 10, 35, 38 are arranged along the same axis, as shown in FIG. 1.

With released brake, the brake control valve 2 keeps the pipeline 6 vented to atmosphere through retainer valve 5. The key valve 7 assumes the switching position shown in FIG. 1: the differential piston 13, under the force of spring 28, is located in its left end position, which is determinded by abuttment against the housing wall 11. The spring 27 presses the sealing plate 23 againt the valve seat 26; the reduction valve 23, 26 is also closed. The piston rod 17 holds the sensing arm 18 in the position corresponding to the highest position of the adjustment screw 20, which is then at a slight distance above the upper position of the abutment 21, which corresponds to a loaded vehicle. The switching piston 30, under the force of spring 31, is located in its right end position, also determined by abuttment against the housing wall 11, the valve pipe 25 extending into the recess 22 and thus holding the stop 24 open by a certain play, to be explained below. The spring 37 holds the double sealing plate 35 on the valve seat 38, the plunger 33 ends at a slight distance before the double sealing plate 35. The pipeline 6 is thus connected to the brake cylinder 44 by the interior space 9, the valve chamber 36 and the pipeline 43.

The above-mentioned play of the stop 24 is determined as follows: when the differential piston 13 moves to the right according to FIG. 1, the sensing arm 18 is pivoted counterclockwise via the piston rod 17 until the adjustment screw 20 first contacts the abutment 21 corresponding to a loaded vehicle. This shifting of the differential piston 13 is less than the play of the stop 24, so that the stop 24 is not closed and the relief valve 23, 26 remains closed. However, if the differential piston 13 shifts far enough to the right for the adjustment screw 20 to contact the abutment 21', corresponding to an unloaded vehicle, the stop 24 closes after travelling the above-mentioned play and the sealing plate 23 is then lifted from the valve seat 26.

When braking with a loaded vehicle, the brake control valve 2 leads a first brake pressure into the pipeline 6. This first brake pressure loads the first control chamber 8, the recess 22, and the inside space 9 and also reaches the brake cylinder 44 through the valve chamber 36 and the pipeline 43. As soon as the first brake pressure attains a certain, still low level of, e.g., 12 psi, the differential piston 13 starts shifting towards the right as seen in FIG. 1, against the force of the spring 28. By this, the sensing arm 18 is turned in a lowering direction of the adjustment screw 20 until the latter contacts the abutment 21 corresponding to a loaded vehicle. The sensing arm 18 can then turn no further and retains the differential piston 13 through the piston rod 17 in the attained position. Up to this point, the shifting path of the differential piston 13 was less than the play of stop 24, so that stop 24 remains open and the reduction valve 23, 26 closed. With a further increase of the first brake pressure to its maximum level, the key valve 7 remains in the now attained switching position, and the first brake pressure reaches the braking cylinder 44 unhindered through the valve chamber 36.

During the subsequent release, the procedures are reversed accordingly. The brake cylinder 44 is vented through the valve chamber 36, the inside space 9 and the brake control valve 2. If the still low pressure level is exceeded, the spring 28 pushes the differential piston 13 towards the left until it contacts the housing wall 11 and the sensing arm 18 turns back to its starting position while lifting the adjustment screw 20 from the abutment 21.

When braking with a empty vehicle, the first brake pressure triggered by the brake control valve 2 into the pipeline 6 again impacts the first impact chamber 8 with the recess 22, as well as the brake cylinder 44 through the inside space 9 and the valve chamber 36, until the already mentioned, still low pressure level is reached, at which the differential piston 13 shifts towards the right against the force of the spring 28. The differential piston 13 then travels a lift istance which is sufficient for lowering the sensing arm 18 until the adjustment screw 20 contacts the abutment 21' corresponding to an unloaded vehicle. During this shift of the differential piston 13, the stop 24 closes and the sealing plate 23 is lifted from the valve seat 26. Compressed air then flows from the first impact space 8 through the valve pipe 25 into the third impact space 29, and through the pressure medium channel 32 into the second impact space 15. At the same time, this compressed air passes through the pressure medium channel 40 and the reflux valve 41 into the air container 42 and into the entry space 34. As soon as a still relatively low pressure level of, for example 6 psi is attained in the third impact space 29 and thus also in the second impact space 15, the differential piston 13 starts to shift towards the left again, assuming a surface ratio of 1:2 between the smaller and larger impact surface 12 and 14 of this differential piston 13; however, at the same time the switching piston 30 also moves left against the force of the spring 31. The switching piston 30 then, by means of the plunger 33, lifts the double sealing plate 35 from the valve seat 38 and seats it on the valve seat 10 so that, the shuttle valve 10, 35, 38 is switched. During its movement, will hereinafter be referred to as second brake pressure. It is also such a manner that the valve seat 26 reaches the position shown in FIG. 1, shifted towards the left into the recess 22. The differential piston 13 continues to shift towards the left in such a manner that the sealing plate 23, under the force of spring 27, is seated on valve seat 26 and shuts off the compressed air stream into the second and third impact space 15 and 29; with the cited surface ratio of 1:2 on the differential piston 13, this occurs when the still low pressure of about 12 psi prevails in the first impact space 8, when about 6 psi are reached in the second and in the third impact spaces 15 and 29. With the switching of the shuttle valve 10, 35, 38 there is a pressure equalization between the brake cylinder 44 and the container 42, previously also charged to about 6 psi, the reflux valve 41 preventing a releast of compressed air to the second and third impact spacees 15 and 29.

It should be pointed out that, in the second and third impact spaces 15 and 29, there is a brake pressure reduced in comparison to that prevailing in the pipeline 6 and the first impact space 8, corresponding to the surface ratio of the differential piston 13, which brake pressure will hereinafter be referred to as second brake pressure. It is also essential that, with the shifting of the differential piston 13 towards the left to the reclosure of the reduction valve 23, 26, the sensing arms 18 is turned via the piston rod 17 in the lift-off direction of the adjustment screw from the abutment 21', and the adjustment screw 20 remains at a certain distance above the abutment 21' during further braking, so that between the two no further wear due to vehicle shocks can occur during the continuing braking process.

When subsequently the control valve leads an increase of the first brake pressure into the pipeline 6, which generally follows continuously after the cited procedures, during which time the cited pressure level is simply passed through, the differential piston 13 shifts slightly to the right, under the influence of the increasing pressure impact by the increasing first brake pressure prevailing in the first impact space 8, until the release valve 23, 26 opens, whereupon compressed air from the first impact space 8 streams through the valve pipe 25 into the third impact space 29 and the second impact space 15, until these have again attained a second brake pressure corresponding to the surface ratio of the differential piston 13. The differential piston 13 then shifts back towards the left until the reduction valve 23, 26 is closed again. The second brake pressure thus led into the third impact space 29 soon exceeds the equalizing pressure prevailing in the brake cylinder 44 and the air container 42, so that compressed air will also flow from the third impact space 29 through the pressure means channel 40 and the reflux valve 21 into the air container 42, and through the inlet space 34 and the valve chamber 35 into the brake cylinder 44, and there also builds up a second, reduced brake pressure, corresponding to the surface ratio on the differential piston 13.

Thus, as a result, the brake cylinder 44 is impacted by a second brake pressure which is reduced as compared to the first brake pressure corresponding to the surface ratio of the differential piston 13. The air container 42 accepts an amount of air which is measured, by a suitable choice of its size, so that the amount of air needed for impacting brake cylinder 44 and air container 42 with the second brake pressure at least approximately corresponds to that which the brake cylinder 44 would hold alone from charging with the first brake pressure. Thus, with regard to the brake control valve 2 and possibly the auxiliary air container 3 and also the emergency brake container 4, there is no difference regarding air consumption, regardless of whether the brake cylinder 44 is loaded with the first or the reduced second brake pressure. The brake control valve 2 thus is capable to lead, with a loaded or unloaded vehicle, always the right amount of a first brake pressure, corresponding to the pressure processes in the main air line 1, into the pipeline 6, and the vehicle is always braked at the correct brake level corresponding to the braking need.

During the subsequent release, the brake control valve 2 vents to atmosphere the first brake pressure prevailing in pipeline 6, the pressure in the first impact space 8 and inside space 9 also being lowered. The differential piston 13 moves left due to the initially remaining charge by the second impact space 15 until it abuts the housing wall 11, the reduction valve 23 26 remaining closed. As soon as the pressure prevailing in the second control chamber 8 falls below the pressure level prevailing in the second and third impact space 15 and 29, the sealing plate 23 lifts in a reflux type manner from the valve seat 26, so that with further pressure reduction in the first brake pressure the pressure prevailing in the second and third impact space 15 and 29 is also lowered. Just before complete venting has occurred, for example at the cited approx. 6 psi, the spring 31 will shift the switching piston 30 to the right until it contacts the housing wall 11, so that it reaches the illustrated right end position. Under the force of spring 37, the double sealing plate 35 follows the movement of the switching piston 30, lifting from the vlave seat 10 and seating, in a reflux type manner, on the valve seat 38. Now, the compressed air flows from the brake cylinder 44 through the valve chamber 36 and the pipeline 6 as well as the brake control valve 2 also into the atmosphere. A soon as the pressure in the valve chamber 36 has dropped, the air container 42 also starts venting into the valve chamber 36 and through the pipeline 6, through the entry space 34 and the opening 39 as well as through the valve part 35, 39 which opens in a reflux type manner. The release state is reached as soon as the brake cylinder 44 has been fully vented and in the second and third impact space 15 and 29 a negligible rest pressure has been attained, corresponding to the restraining effect of the spring 27 and of the spring 37 in the air container 42. This leads essentially back to the starting position.

In a variation to the above described embodiment, the reflux valve 41 in the pressure means channel 40 can be omitted if, at the beginning of braking with an unloaded vehicle, a pressure equalization of the brake cylinder 44, initially impacted through the open valve part 10, 35 with the still low first brake pressure is permitted not only to the air container 42, but also to the second and third impact space 15 and 29. During the subsequent release, this has the advantage that the brake cylinder 44 already starts emptying as soon as the pressure level prevailing in the first impact space 8 falls below the brake pressure prevailing in the second and third impact space 15 and 29. Because of the reduction valve 23, 26, opening in a reflux type manner, not only the second and third impact spaces 15 and 29 are emptied but also the air container 42 and the brake cylinder 44, until the switching piston 30 reaches its right end position. Subsequently the brake cylinder 44 vents directly through the opened valve part 10, 35 to the brake control valve 2, while the air container 42 and the spaces connected to it vent further through the reduction valve 23, 26 which retains the lower retaining pressure, or the valve part 35, 38.

In another variation it is possible to construct the load-dependent brake control device according to FIG. 2. In the key valve 7', there are the differential piston 13 with the relief valve 26, 23, the first impact space 8, the second impact space 15 and the third impact space 28, the latter two being connected by the pressure means channel 32. The differential piston 13 is coupled to the sensing arm 18 by means of the piston rod 17. The valve pipe 25 is locrated on a switching piston 30a which is movable against the force of spring 31 by means of the second brake pressure prevailing in the third impact space 29. The air container 42 is connected to the third impact space 29. To this extent, the construction and operation of key valve 7' corresponds to the arrangement according to FIG. 1, but without reflux valve 41.

According to FIG. 2, a pipeline 45 leads from the second impact space 15 to a separately mounted switching valve 46, containing the shuttle valve. The switching valve 46 contains, arranged side-by-side in a row, chambers 47, 48 and 49, the center chamber 48 being connectable to the two lateral chambers 47 and 49 by apertures 50 and 51 in the wall. The pipeline 45 terminates in chamber 47 which is separated from another chamber 53, continuously impacted by atmospheric pressure, by a diaphragm piston 52. Chamber 53 contains a spring 54 which biases the diaphragm piston 42 against the entry of aperture 50 into chamber 47 and thus acts on aperture 50 in the closing direction. The brake cylinder 44 is connected by means of the pipeline 43 to the center chamber 48. In the other, lateral chamber 49, there is a valve seal 55 which is biased by a spring 56 in the abutment direction towards the entry of the aperture 51 and thus tends to close the latter. Chamber 49 is connected to pipeline 6. Between the diaphragm piston 52 and the valve seal 55, there is a plunger 57, extending through apertures 50 and 51, the length of the plunger 57 being greater by one switching lift than the distance between the openings of the apertures 50 or 51 to be covered by the diaphragm piston 52 and the valve seal 55, so that one of these apertures 50 or 51 is always open. the diaphragm piston 52, the valve seal 55 and the entries of the apertures 50 and 51 thus constitute a shuttle valve which alternatingly connects one of the lateral chambers 47 and 49 to the center chamber 48.

When braking with loaded vehicle, it is possible, as disclosed in FIG. 1, to lower the scanning arm only until it contacts abutment 21, the reduction valve 23, 26 remaining closed and the third and second impact spaces 29 and 15, as well as chamber 47, remain without pressure. The first brake pressure, led by the brake control valve 2 into the pipeline 6, passes through chamber 49 of the switching valve 46 and through the aperture 51 and chamber 48 to brake cylinder 44; spring 54 is stronger than spring 56 and keeps valve seal 55 lifted off aperture 51.

When braking with an empty vehicle, the scanning arem 18 can pivot downward until it contacts abutment 21', the differential piston 13 receiving a lift sufficient for opening the reduction valve 23, 26. Through the reduction valve 23, 26 the third impact space 29 and the second impact space 15 are charged with a reduced second brake pressure, as disclosed in FIG. 1. As soon as this second brake pressure reaches a relatively low level, e.g., 6 psi with a surface ratio of the differential piston 13 of 1:2, the switching piston 30a lifts against the force of spring 31 and draws the valve pipe 25 with the valve seat 26 somewhat upward. The differential piston 13 follows the lift motion and, in doing so, lifts the scanning arm off the abutment 21'. The second brake pressure also impacts chamber 47 through pipeline 45 and presses the diaphragm piston 52 towards the right against the force of spring 54, whereupon the diaphragm piston 52 lifts from the entry of aperture 50 and thus opens the latter, while the valve seal 55 seats on the entry of aperture 51 and closes the latter. Now, the brake cylinder 44 is impacted by the second brake pressure, thus by a reduced pressure level, the operation corresponding that described with respect to FIG. 1, but eliminating reflux valve 41. The subsequent release is the same as described in connection with FIG. 1, so that another description is unnecessary.

If the air container 42 is separated from its direct connection to the third impact space 29 and instead connected to the pipeline 45, a reflux valve 41, corresponding to the reflux valve in FIG. 1, can be provided in the pipeline 45 between the second impact space 15 and the connection to the air container 42, opening in the flow direction to chamber 47. The operation of the brake control device according to FIG. 2 then fully conforms to that according to FIG. 1.

By changing the surface ratio on the differential piston 13, the pressure ratio between the first and second brake pressures can be adapted to the pervailing vehicle status; adaptation of the air container volume may also be appropriate.

The construction and operation of retainer valve 5 conforms to known embodiments and thus does not require further explanation.

What is claimed is:

1. Load-dependent brake pressure control device for indirectly acting, direct-release pneumatic rail vehicle brakes, said control device comprising a brake control valve (2) controlling a first brake pressure; a key valve (7; 7') having a key piston which is acted on by said first brake pressure in opposition of a spring means (28), for moving a sensing arm (18) sensing deflection of an abutment of a rail vehicle, and valve means switching in dependence on an adjustable key position of said sensing arm (18); said valve means transmitting said first brake pressure to a brake cylinder (44) when a position of said key valve corresponds to a loaded vehicle and said valve means transmitting said first brake pressure to an air container (42) when said position of said key valve corresponds to an unloaded vehicle; and a reduction valve (23, 26) controlled by a differential piston (13) having a smaller surface and a larger surface and reducing said first brake pressure to a second brake pressure also transmitted to said brake cylinder (44); means for loading said differential piston (13) on said smaller surface (12) by said first brake pressure prevailing in a first impact space (8), and on said larger surface (14) by said second brake pressure, prevailing in a second impact space (15), said reduction valve (23, 26) being a reflux valve opening in the flow direction to said brake control valve (2), wherein (a) said differential piston (13), together with said reduction valve (23, 26), which constitutes a part of said valve means, is arranged in said key valve (7; 7') and mechanically coupled to said sensing arm (18) and comprising means for directing said first brake pressure in the direction of movement of said sensing arm (18) to said key positions;

(b) a stop (24) effective in the opening direction of the reduction valve (23, 26) is provided between a first valve part (23) of the reduction valve (23, 26), spring-loaded (27) in the closing direction, and the differential piston (13), the stop (24) having a play whose magnitude, relative to the lift to said differential piston (13) for adjusting the key positions of said sensing arm (18), falls between the respective lifts for said key positions for loaded and unloaded vehicles;

(c) a second valve part (26) of said reduction valve (23, 26) disposed in a connection between said first and a third impact space (8, 29) is connected to a switching piston (30; 30a) also disposed in said key valve (7; 7'), said switching piston being loaded in an opening direction of said reduction valve (23, 26), in opposition to spring means (31), by said second brake pressure in said third impact space (29), the lift of said switching piston being smaller than the play of said stop coupling (24);

(d) the third impact space (29) is connected to the air container (42); and (e) a shuttle valve (10, 35, 38), switching in dependence on the second brake pressure, selectively connects the brake cylinder
  (i) with a space (9; 49) that constantly holds the first brake pressure, when said switching piston (30; 30a and 52) is not loaded, and
  (ii) otherwise to said air container (42).

2. Brake pressure control device according to claim 1, wherein said shuttle valve (10, 35, 38) is switched by said switching piston (30).

3. Brake pressure control device according to claim 2, wherein said differential piston (13) has a recess (22) containing a valve part constructed as a sealing plate (23).

4. Brake pressure control device according to claim 3, wherein the switching piston (30) carries a valve pipe (25) extending in a movable sealed manner into said first impact space (8) and terminating in said recess (22), said second valve part being a valve seat (26).

5. Brake pressure control device according to claim 1, wherein said differential piston (13) carries a piston rod (17) extending in a movable sealed manner though said second impact space (15), and having an end linked to said sensing arm (18).

6. Brake pressure control device according to claim 2, wherein said switching piston (30) carries a plunger (33) extending in a movable sealed manner into an inlet space (34) and terminating there in front of a double sealing plate (35) in a valve chamber (36), and comprising means for permanently connecting said inlet space (34) to said air container (42), and to said valve chamber (36) through an opening (39) surrounding said valve seat (38) which is spring-loaded into closed position by said double sealing plate (35), said plunger being adapted to seat said double sealing plate (35) on a second valve seat (10) in opposition to spring means (37), the inside space (9) of said valve seat constantly containing said first brake pressure.

7. Brake pressure control device according to claim 1, wherein said differential piston (13), said switching piston (30), said reduction valve (23, 26) and said shuttle valve (10, 35, 38) are coaxial.

8. Brake pressure control device according to claim 1, wherein a reflux valve (41) opening in the flow direction towards said air container (42) is disposed in a connection (40) between said third impact space (29) and said air container (42).

9. Brake pressure control device according to claim 1, wherein the shuttle valve is located in a switching valve (46) with three chambers (47, 48 and 49), comprising a center chamber and two lateral chambers arranged in a row, said center chamber (48) being permanently connected to said brake cylinder (44) and being selectively connected to said lateral chambers (47, 49) by apertures in a separating wall (50, 51), means being provided for covering entries into said apertures (50, 51) by valve seals (52; 55), located under a spring force in said lateral chambers (47, 49), a plunger (57) extending between said valve seals and having a length which exceeds by one switching lift the distance between said entries, one of said lateral chambers (47) being permanently connected to said air container (42) and delimited opposite the entry by a piston member (52) connected to a valve seal located in it, and the other lateral chamber (49) being continuously impacted by said first brake pressure.

* * * * *